(12) United States Patent
Porte et al.

(10) Patent No.: US 8,733,501 B2
(45) Date of Patent: May 27, 2014

(54) METHOD FOR PRODUCING AN ACOUSTIC TREATMENT PANEL

(71) Applicant: Airbus Operations SAS, Toulouse (FR)

(72) Inventors: Alain Porte, Colomiers (FR); Nicolas Casse, Toulouse (FR); Grégory Albet, Toulouse (FR)

(73) Assignee: Airbus Operations SAS (FR)

( * ) Notice: Subject to any disclaimer, the term of this patent is extended or adjusted under 35 U.S.C. 154(b) by 0 days.

(21) Appl. No.: 13/709,300

(22) Filed: Dec. 10, 2012

(65) Prior Publication Data

US 2013/0146393 A1    Jun. 13, 2013

(30) Foreign Application Priority Data

Dec. 13, 2011  (FR) ...................... 11 61513

(51) Int. Cl.
  *E04B 1/82*   (2006.01)
(52) U.S. Cl.
  USPC ........................ 181/292; 244/1 N; 415/119
(58) Field of Classification Search
  USPC ............... 181/292, 290; 244/1 N; 415/119
  See application file for complete search history.

(56) References Cited

U.S. PATENT DOCUMENTS

| | | | |
|---|---|---|---|
| 3,011,602 A * | 12/1961 | Ensrud et al. | 428/180 |
| 4,076,100 A * | 2/1978 | Davis | 181/290 |
| 4,944,362 A * | 7/1990 | Motsinger et al. | 181/213 |
| 5,934,611 A * | 8/1999 | Tindell et al. | 244/53 B |
| 7,484,592 B2 * | 2/2009 | Porte et al. | 181/292 |
| 7,938,224 B2 * | 5/2011 | Frustie et al. | 181/214 |
| 8,230,969 B2 * | 7/2012 | Frederick et al. | 181/293 |
| 8,251,175 B1 * | 8/2012 | Englert et al. | 181/292 |
| 8,413,761 B2 * | 4/2013 | Ayle | 181/292 |
| 8,453,793 B1 * | 6/2013 | Franzoi et al. | 181/292 |
| 2005/0147790 A1 * | 7/2005 | Levavasseur | 428/116 |

FOREIGN PATENT DOCUMENTS

| | | |
|---|---|---|
| DE | 19952689 A1 | 5/2001 |
| EP | 1098294 A2 | 5/2001 |
| EP | 2026325 A2 | 2/2009 |
| WO | 9806564 A1 | 2/1998 |

* cited by examiner

*Primary Examiner* — Forrest M Phillips
(74) *Attorney, Agent, or Firm* — Lerner, David, Littenberg, Krumholz & Mentlik, LLP

(57) ABSTRACT

A method for producing an acoustic treatment panel, including:
  assembling two plates, at least one of which is deformed so as to separate the plates locally in order to form cavities of a cellular structure between the two plates, said cavities being delimited by facets and partitions formed by at least one of the deformed plates,
  producing at least one opening on the facets of one of the two plates, and
  pressing an acoustically resistive plate against the surface of the cellular structure including the openings.

12 Claims, 5 Drawing Sheets

METHOD FOR PRODUCING AN ACOUSTIC TREATMENT PANEL

FIELD OF THE INVENTION

The present invention relates to a method for producing an acoustic treatment panel as well as a panel obtained using that method, said panel more particularly being suitable for integrating a frost treatment function. An aircraft propulsion assembly comprises a nacelle in which an engine is substantially concentrically arranged.

BACKGROUND OF THE INVENTION

As illustrated in FIG. 1, a nacelle 10 comprises a front air intake 12 making it possible to channel a flow of air toward the engine.

Following a longitudinal cross-section (containing the axis of rotation of the engine), an air intake 12 comprises a lip 14 extended outside the nacelle by an outer wall 16 and inside by the inner wall 18 defining an inner duct 20 making it possible to channel the air toward the engine.

The nacelle also comprises a front frame 22 that delimits an annular duct 24 with the lip 14 that can be used to channel hot air for frost treatment.

To limit the impact of noise annoyances, techniques have been developed to reduce internal noise, in particular by arranging panels or coverings at the walls of the inner duct 20, aiming to absorb part of the sound energy, in particular by using the principle of Helmholtz resonators.

To optimize acoustic treatment, these panels must cover the largest possible surface. Some acoustic treatment panels 26 may cover the inner duct 20, those panels remote the front frame not performing a frost treatment function. In that case, an acoustic panel comprises, from the outside toward the inside, an acoustically resistive layer 28, at least one cellular structure 30, and a reflective layer 32.

Other panels may be arranged in the annular duct at the front of the frame 22 and combine the acoustic treatment and frost treatment functions. Lastly, an acoustic treatment panel 34 with heat resistant materials may be inserted between the front frame 22 and the panels 26. That panel 34 also incorporates the frost treatment function and comprises means for capturing the hot air in the annular duct 24 and expelling it toward the rear in the inner duct 20.

Such a panel combining the acoustic treatment and frost treatment functions is in particular described in patent FR-2,917,067. It comprises, from the outside toward the inside, an acoustically resistive layer, at least one cellular structure, and a reflective layer, as well as channels each delimited by a wall inserted between the acoustically resistive layer and the cellular structure.

This solution makes it possible to limit the risks of communication between the inside of the channels and cells of the cellular structure, and therefore the risks of disruptions in the acoustic treatment.

In all cases, as illustrated in FIG. 2, the cellular structure 30 comprises ducts 36 oriented perpendicular to the reflective and acoustically resistive layers, one of the two emerging ends of which is covered by the acoustically resistive layer, and the other of which is covered by the reflective layer.

According to one embodiment, the cellular structure comprises partitions 38 oriented perpendicular to the reflective and acoustically resistive layers, defining a honeycomb.

According to another embodiment, the cellular structure comprises strips oriented perpendicular to the reflective and acoustically resistive layers that interlace as shown in document FR-2,912,780.

For the acoustic panel to perform well, it is necessary for the cells not to be able to communicate with each other so as to avoid a flow of air being created inside the acoustic treatment panel from a first point to a second, remote point capable of disrupting the flow of air channeled by the air intake and the inner duct 20.

As a result, the peripheral edges of the ends of each duct 36 of the cellular structure must be in contact with the reflective or acoustically resistive layer and substantially sealably connected with said layers.

In the case of an acoustic treatment panel made from a composite material, this connection between the peripheral edges of the ends of the ducts of the cellular structure and one of the two reflective or acoustically resistive layers is done by adhesion.

In the case of a metal acoustic treatment panel, this connection is done by welding or brazing. This is a delicate operation.

According to another issue, the acoustic treatment panels are generally made flat and are shaped to adapt to the shapes of the inner duct 20 or the air intake. During this shaping, given the stiffness of the honeycomb structure, the connections between the peripheral edges of the ends of the ducts of the cellular structure and the two reflective or acoustically resistive layers are subject to stresses that can damage them.

The risks of leaks between the cells are even more significant inasmuch as the cells are present at the connection of the cellular structure and the acoustically resistive layer, as well as the connection between the cellular structure and the acoustically resistive layer.

BRIEF SUMMARY OF THE INVENTION

Consequently, various aspects of the present invention aim to offset the drawbacks of the prior art by proposing a method for producing an acoustic treatment panel making it possible to limit the risks of leaks between the cells capable of disrupting the operation of said panel.

To that end, as aspect of the invention relates to a method for producing an acoustic treatment panel, characterized in that it comprises the following steps:
   assembling two plates, at least one of which is deformed so as to separate the plates locally in order to form cavities of a cellular structure between the two plates, said cavities being delimited by facets and partitions formed by at least one of the deformed plates,
   producing at least one opening on the facets of one of the two plates, and
   pressing the acoustically resistive plate against the surface of the cellular structure including the openings.

BRIEF DESCRIPTION OF THE DRAWINGS

Other features and advantages will emerge from the following description of the invention, provided solely as an example, in light of the appended drawings and in which:

FIGS. 4 and 5 show a cellular structure 40 with partitioned cells 42.

DETAILED DESCRIPTION

Figure 1:
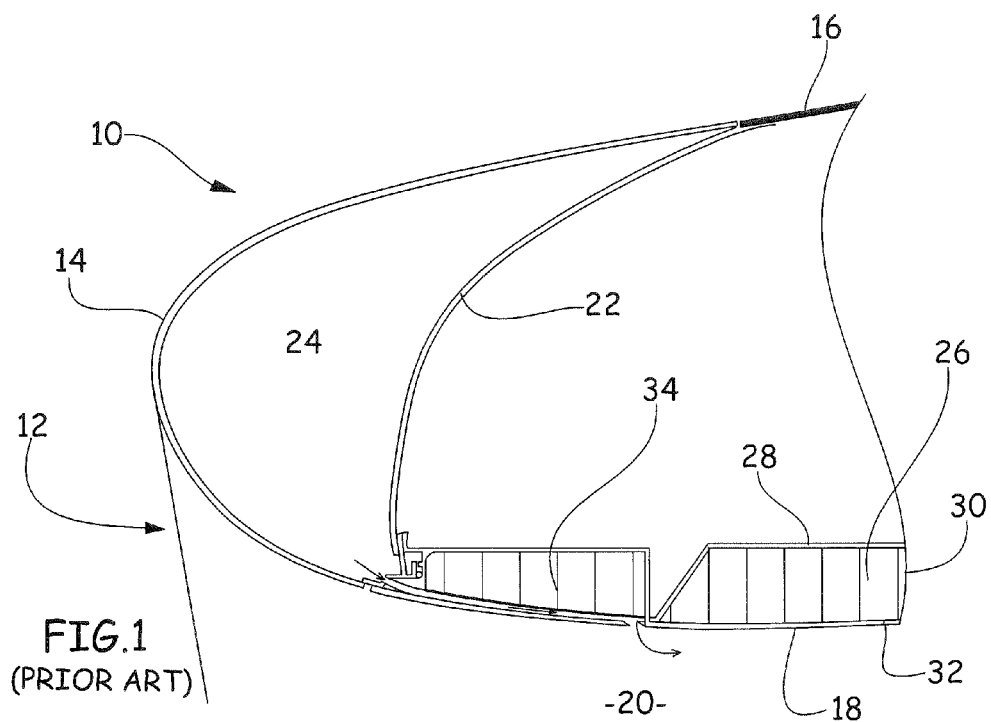
FIG. 1 is a longitudinal cross-sectional view of part of an air intake according to the prior art.
Figure 2:
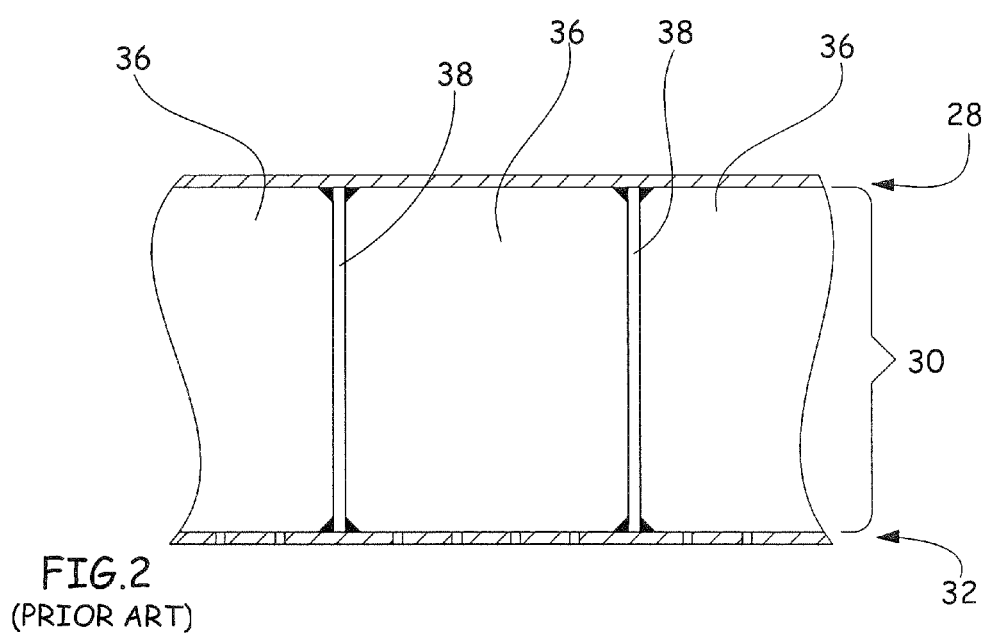
FIG. 2 is a cross-sectional view illustrating the details of an acoustic treatment panel according to the prior art.

According to one embodiment of the invention, a cellular structure 40 is obtained from two cellular half-structures 44, 44' assembled at a junction plane 46.

Each cellular half-structure 44 or 44' comprises a set of coplanar facets 48 separated by a grid of grooves 50, the flanks 52, 52' of which serve for each of them as part of the partition separating two cells 42 of the cellular structure.

The grooves 50 of a same half-structure all have the same depth, such that the lower ends of the grooves are coplanar. In this way, if the plate is oriented such that the grooves are downwardly open, the peaks C are coplanar and delimit hollow shapes between them that each correspond to part of a cell 42.

According to one embodiment, the grooves 50 are oriented in at least two secant directions.

Preferably, the grooves 50 are oriented in two perpendicular directions.

To form a cellular structure, two cellular half-structures 44 and 44' should be assembled that have identical grooves 50 such that the peaks C define the same mesh of a cellular half-structure relative to one another and such that the peaks C of the cellular half-structure 44 are joined with the peaks C of the cellular half-structure 44' so as to isolate the cells 42 from one another.

According to one alternative, the junction plane is a median plane and the grooves 50 of two half-structures have the same depth.

According to other alternatives, the junction plane may not be a median plane, the grooves of one half-structure being deeper than those of the other half-structure.

Figure 15:
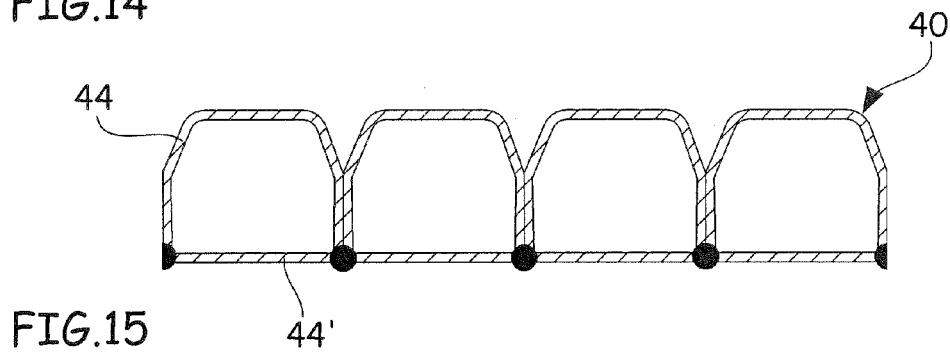
FIG. 15 is a cross-sectional view of another alternative of a cellular structure according to the invention.

In the extreme, a half-structure 44' may assume the form of a planar plate, as illustrated in FIG. 15. In that case, only one half-structure 44 is deformed and the junction plane 46 is provided at the planar half-structure 44'.

Figure 3A:
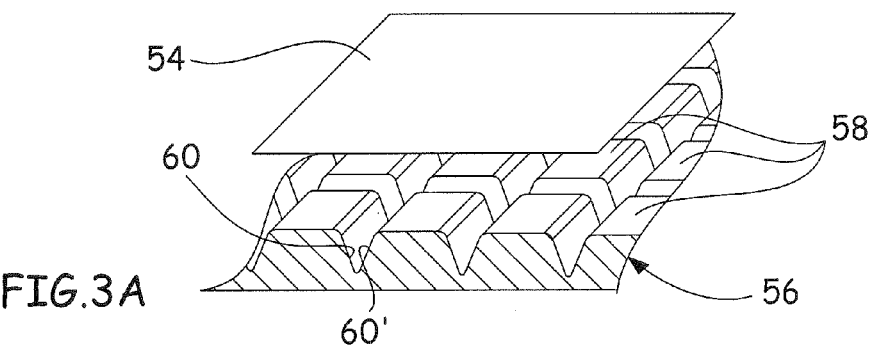
FIG. 3A is a diagrammatic illustration of a plate and a die for obtaining a cellular half-structure according to one alternative of the invention.

According to one preferred embodiment, the cellular half-structures 44 and 44' are each made from a metal planar plate 54 (shown in FIG. 3A), for example made from a titanium alloy. This plate 54 is formed by superplastic forming using a die 56 illustrated in FIG. 3A.

This die 56 comprises a grid of grooves delimiting protruding elements 58 between them, the shapes of which correspond to the hollow shapes of the cellular half-structures. Each groove of the die 56 is delimited by two flanks 60, 60'. Preferably, the flanks form a non-zero angle larger than 5° and smaller than 20°.

Figure 3B:
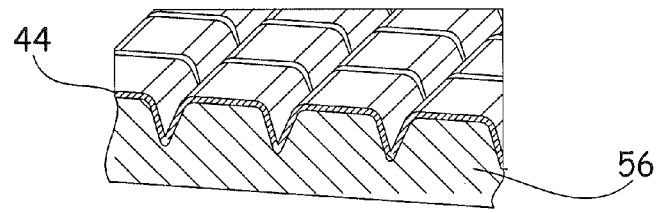
FIG. 3B is a perspective view of part of a cellular half-structure according to one alternative of the invention.
Figure 4:
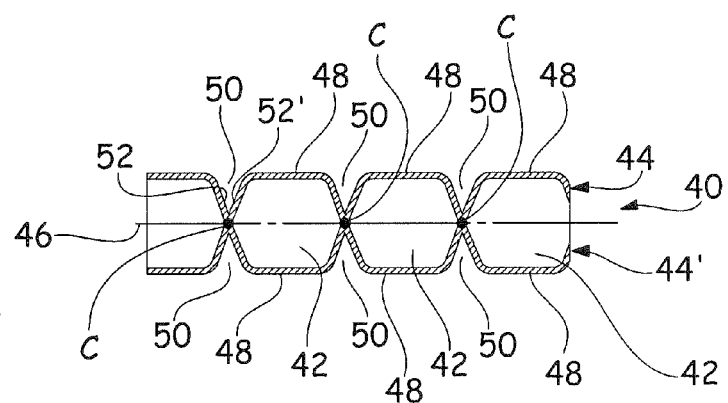
FIG. 4 is a cross-section of a cellular structure according to one alternative of the invention.

FIG. 3B shows the plate 54 deformed on the die 56.

The invention is not limited to the indicated materials. Thus, the cellular half-structures could be made from a composite material. Likewise, the forming of the plates may be done using techniques other than superplastic forming.

To assemble the two cellular half-structures, their peaks C are pressed against one another and assembled using a welding technique, in particular ultrasound welding.

Alternatively, the assembly is done using a diffusion welding technique.

To that end, at least the peaks C of the cellular half-structures are brought to a temperature above a given threshold. At the same time, pressure is exerted tending to press the peaks C against each other. The combination of the high temperatures and pressure leads to obtaining a continuous weld peak C that is completely sealed.

The threshold temperature and the minimum pressure depend on the materials used, and more particularly their rheological characteristics relative to the superplasticity. As an example, for titanium alloy-based cellular half-structures, the temperature must reach 900° C. at the peaks.

Figure 5:
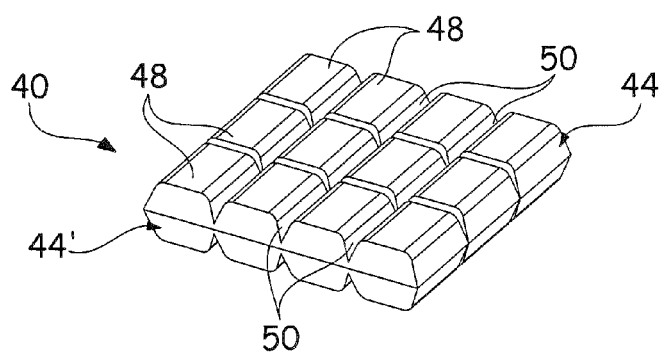
FIG. 5 is a perspective view of the cellular structure of FIG. 4.

After assembly, the cellular structure 40 assumes the form of a volume delimited by two imaginary surfaces, the first imaginary surface comprising all of the facets 48 of a first cellular half-structure 44, the other imaginary surface comprising all of the facets 48 of the second cellular half-structure 44', as illustrated in FIG. 5.

Figure 12:
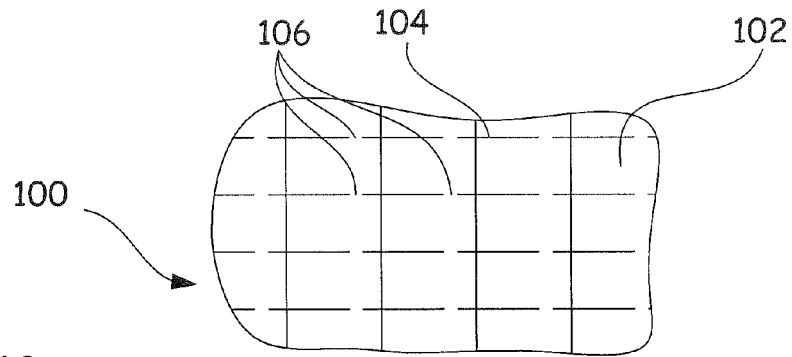
FIG. 12 is a top view of a plate assembled to another plate before they are deformed so as to make it possible to obtain a cellular structure according to one alternative of the invention.
Figure 13:
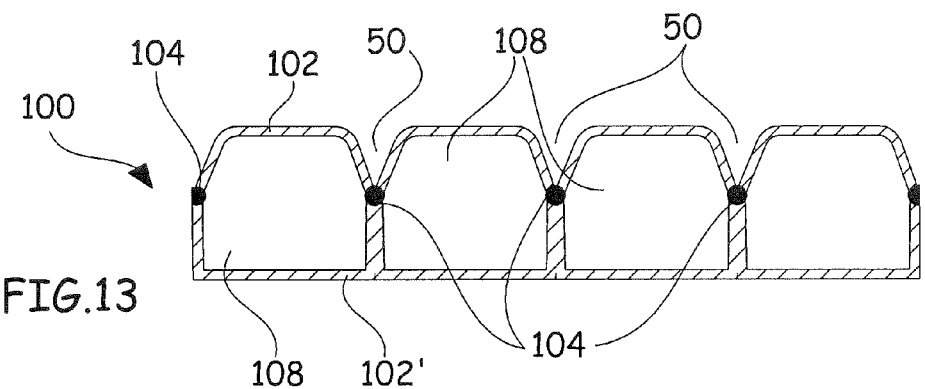
FIG. 13 is a cross-section of a cellular structure obtained from plates illustrated in FIG. 12, deformed.
Figure 14:
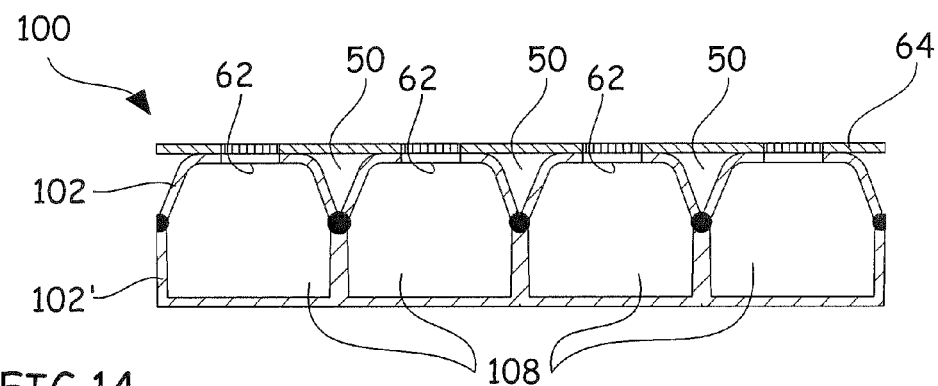
FIG. 14 is a cross-sectional view of an acoustic treatment panel obtained from the cellular structure of FIG. 13.

FIGS. 12 to 14 show another embodiment of a cellular structure 100. It comprises two planar plates 102, 102' that are assembled following a grid of junction lines 104. This grid of junction lines is identical to the grid of partitions of the cellular structure 100 that one wishes to obtain. In the example illustrated in FIG. 12, the grid of junction lines 104 comprises two series of substantially rectilinear junction lines, the junction lines of the first series being parallel to each other and perpendicular to the junction lines of the second series. After deformation, this type of grid makes it possible to obtain square or rectangular cells.

According to one embodiment, the grid of junction lines is made using a diffusion welding technique.

According to one important point of this alternative, certain junction lines comprise discontinuities 106 so as to be able to make all of the areas 108 delimited by the grid of junction lines communicate with a pressurized fluid source.

After assembly, at least one of the two plates is deformed, so as to obtain a structure similar to that shown in FIG. 15. Preferably, both plates 102, 102' are deformed, as illustrated in FIG. 13.

According to one embodiment, the two plates 102, 102' are metal, for example made from a titanium alloy. They are formed by superplastic forming using to dies positioned on either side of the two plates and injecting a pressurized fluid between the two plates. One of the two dies may be similar to the die 56 and comprise a grid of grooves so as to obtain a grid of grooves 50 at least at one of the plates, in particular the plate 102.

During the deformation, certain areas of the plates move apart so as to obtain cells, as illustrated in FIG. 13. According to this alternative, one of the dies across from the plate 102' is substantially planar, whereas the die across from the plate 102 is similar to the die 56.

After deformation, the plates 102, 102' form cellular half-structures and the discontinuities provided at the grid of junction lines are covered so as to obtain cells that are sealed relative to one another. This operation may be performed using diffusion welding.

Irrespective of the embodiment, the cellular structure is obtained by assembling two plates that are formed before or after being assembled. After deformation, the plates each comprise a plurality of facets 48, the facets of the first plate being positioned across from the facets of the second plate. After deformation, certain portions of at least one plate form the partitions that separate the cells of the cellular structure from one another. To ensure sealing between the cells, the two plates are welded along a grid of junction lines that corresponds to the grid of partitions of the cells of the cellular structure.

To be able to be used as a cellular structure of an acoustic treatment panel, the cellular structure 40 comprises at least one opening 62 at least at one facet 48 of a single cellular half-structure 44.

Generally, all of the facets 48 of a single cellular half-structure 44 comprise at least one opening 62. The facets 48 of the other cellular half structure 44' do not comprise any openings and perform the reflective layer function. In the case of the cellular structure 100, the openings 62 are made at the facets of a single plate, in this case the plate 102, as illustrated in FIG. 14.

The openings 62 may have different sections. In this way, each facet 48 may comprise a multitude of microperforations. Preferably, each facet 48 comprises an opening 62.

The openings 62 are made before or after assembling two half-structures 44 and 44' or two plates 102 and 102'.

According to one embodiment, the openings 62 are obtained by die trimming.

Advantageously, the openings 62 must have a maximum section. Thus, preferably, for each cell, the opening 62 corresponds to more than 80% of the surface area of the facets 48.

Figure 6:
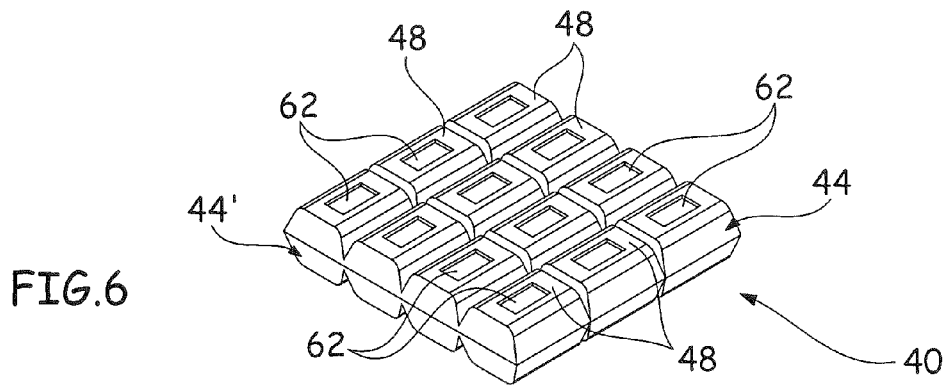
FIG. 6 is a perspective view of the cellular structure of FIG. 5 after producing openings for the cells.

Thus, as illustrated in FIG. 6, the cellular structure 40 assumes the form of a volume delimited by two imaginary surfaces, the first imaginary surface comprising all of the facets 48 with openings 62 of the cellular half-structure 44, the other imaginary surface comprising all of the facets 48 without openings of the half cellular half-structure 44'.

To obtain an acoustic treatment panel, an acoustically resistive layer 64 is pressed against the surface of the cellular structure 40 or 100 comprising the facets 48 with the openings 62.

The acoustically resistive layer 64 is a porous structure having a dissipative role, partially converting the acoustic energy of the sound wave passing through it into heat. This acoustically resistive layer is in particular characterized by an open surface rate that essentially varies as a function of the engine, the components making up said layer.

According to one embodiment, the acoustically resistive layer 64 assumes the form of at least one layer of woven or nonwoven fibers, the fibers preferably being coated with a resin to ensure the reaction of forces in the different directions of the fibers.

According to another embodiment, the acoustically resistive structure 64 comprises at least one porous layer for example in the form of a metal or non-metal fabric, such as a wire mesh, and at least one structural layer, for example a metal or composite sheet with oblong holes or microperforations.

According to another embodiment, the acoustically resistive layer assumes the form of a metal sheet with perforations or microperforations.

The assembly of the cellular structure 40 or 100 and the acoustically resistive layer 64 may be done using any suitable means, in particular using a diffusion welding technique.

The advantages procured by the embodiment of the invention are as follows:

The facets of a cellular half-structure or plate performing the function of reflective layer. In this way, it is possible to eliminate the reflective layer, and thereby the risks of leaks at the connections between the partitions of the cellular structure and the reflective layer.

Figure 8:
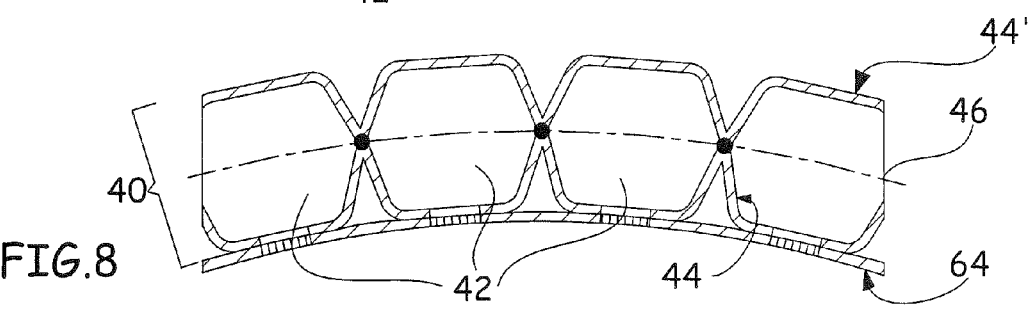
FIG. 8 is a cross-sectional view of a curved acoustic treatment panel according to the invention.

The grooves of the cellular structure give the latter a certain flexibility, as illustrated in FIG. 8. In this way, it is easier to shape the cellular structure so as to adapt its shape to that of the duct or air intake.

In fact, the flanks 52, 52' of the grooves oriented perpendicular to the tangent of the curve radius of the cellular half-structure 44 with the openings are pressed against each other, while the flanks 52, 52' of the grooves oriented perpendicular to the tangent to the curve radius of the cellular half-structure 44' without the openings are spaced apart.

Advantageously, the cellular structure 40 is formed before assembly with the acoustically resistive layer 64. After assembly, the latter keeps the cellular structure in that curved position.

When the junction plane 46 is a median plane, the risks of damage to the connection between the two cellular half-structures 44 and 44' are limited, since the connection is arranged substantially at the "neutral fiber" that undergoes limited stresses due to the curved deformation of the cellular structure.

The acoustic treatment panel according to the invention is more particularly adapted to incorporate the frost treatment function, and to that end comprises channels inserted between the cellular structure 40 and the acoustically resistive structure 64.

Figure 9A:
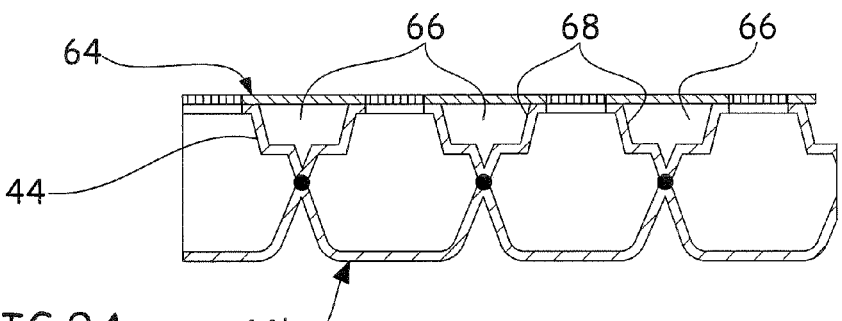
FIG. 9A is a cross-sectional view of an acoustic treatment panel incorporating the frost treatment function according to a first alternative of the invention.

According to a first embodiment illustrated in FIG. 9A, the channels 66 are delimited by the acoustically resistive layer 64 and the cellular half-structure 44. Preferably, the grooves 68 in a first direction are used to delimit the hot air channels. As an example, all of the grooves 68 in a first direction are used to delimit the hot air channels. Alternatively, only certain grooves 68 are used to delimit the hot air channels.

According to another alternative, some or all of the grooves oriented in both directions are used to delimit the hot air channels.

Figure 9B:
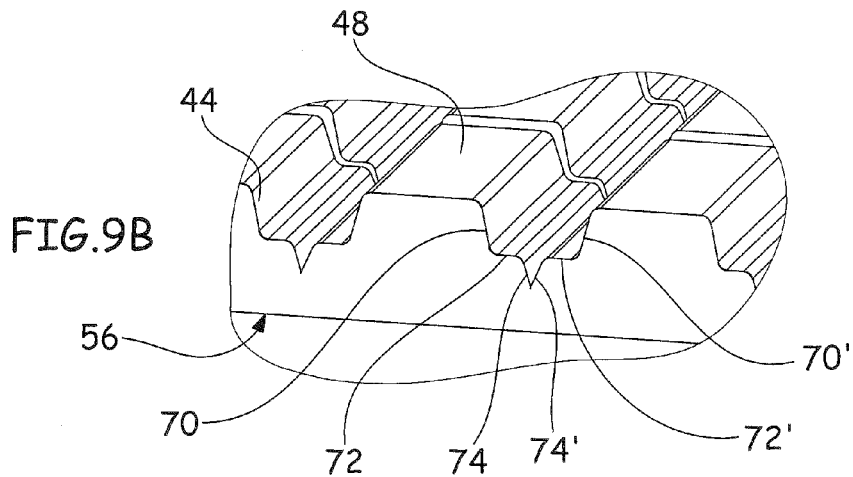
FIG. 9B is a perspective view of a die making it possible to obtain a cellular half-structure used to delimit hot air channels.

Advantageously, a groove 68 used to channel hot air comprises a flared shape. Thus, as illustrated in FIGS. 9A and 9B, a groove 68 of the half-structure or the corresponding groove of the die 56 corresponds to a section delimited by two flanks respectively comprising a first upper portion 70, 70' (connected to the facets 48), a substantially horizontal intermediate portion 72, 72' (corresponding to the bottom of the hot air channel), and a lower portion 74, 74' (furthest from the facets 48). The portions 74, 74' are only slightly spaced apart or pressed against one another, while the upper portions 70 and 70' are spaced apart to favor the flow of air and delimit a U-shaped section with the intermediate portions 72, 72'.

Figure 7:
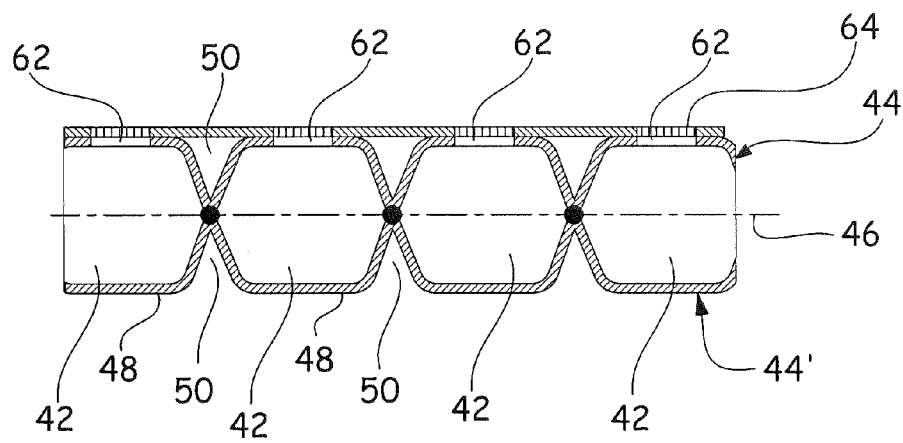
FIG. 7 is a cross-sectional view of an acoustic treatment panel according to the invention, which is substantially flat, incorporating the cellular structure of FIG. 6.
Figure 10:
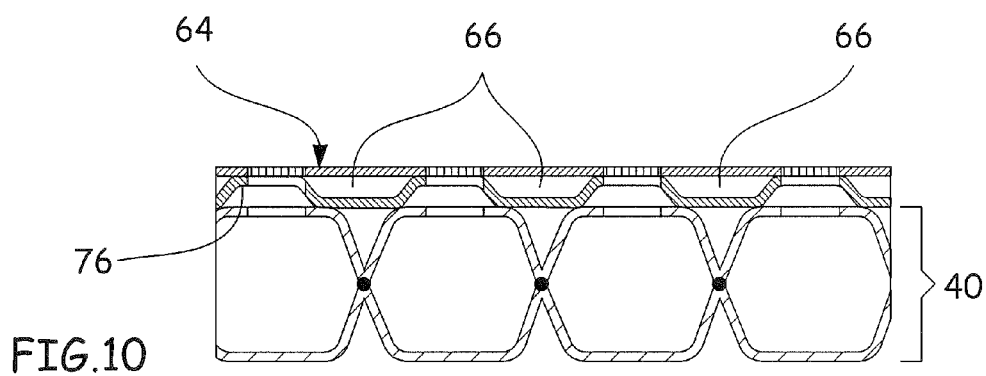
FIG. 10 is a cross-sectional view of an acoustic treatment panel incorporating the frost treatment function according to another alternative of the invention.
Figure 11:
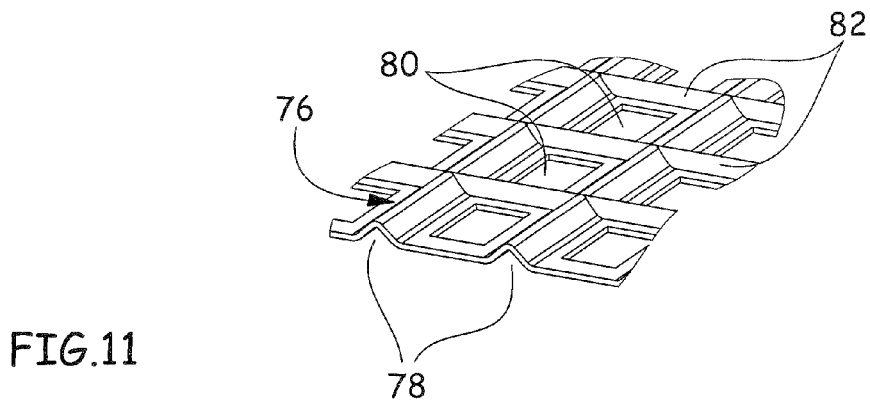
FIG. 11 is a perspective view of a plate delimiting channels incorporated into the panel of FIG. 10.

According to another embodiment illustrated in FIGS. 10 and 11, the hot air channels are delimited by the acoustically resistive layer 64 and a plate 76 inserted between said acoustically resistive layer and a cellular structure as illustrated in FIG. 7 or 8.

The plate 76 is formed with furrows 78 so as to delimit the channels 66 once it is pressed against the acoustically resistive layer 64. According to one embodiment, the plate 76 is formed by superplastic forming. However, other forming techniques may be considered.

After assembly, the acoustically resistive layer 64 and the plate 76 are perforated or microperforated so as to allow the acoustic waves to pass through them in order to reach the cells 42.

Alternatively, the plate 76 may comprise recesses 80 at the open areas of the acoustically resistive layer 64 to allow the acoustic waves to reach the cells 42 as illustrated in FIG. 11.

In both cases, partitions 82 oriented perpendicular to the channels 66 are provided at the surface of the plate 76 oriented toward the cellular structure so as to limit the flow of air between two cells 42.

The invention claimed is:

1. A method for producing an acoustic treatment panel, the method comprising:
   assembling first and second plates, at least one of which is deformed so as to separate the plates locally to form a plurality of cavities of a cellular structure between the first and second plates, said cavities being delimited by a plurality of facets and a plurality of partitions formed by at least one of the deformed plates,
   producing at least one opening on the facets of one of the first and second plates,
   pressing an acoustically resistive plate against the surface of the cellular structure including the openings;
   forming the first and second plates so as to form first and second cellular half-structures each with a set of co-planar facets separated by a grid of grooves, the first and second cellular half-structures having identical grids of grooves, and
   assembling the first and second cellular half-structures by pressing the ends of the grooves of the first and second half-structures against each other.

2. The method for producing an acoustic treatment panel according to claim 1, further comprising deforming the plate in contact with the acoustically resistive layer so as to form a plurality of grooves with a flared shape to delimit channels with said acoustically resistive layer configured for channeling hot air for frost treatment.

3. The method for producing an acoustic treatment panel according to claim 1, further comprising assembling the first and second plates following a grid of junction lines, then deforming the first and second plates between first and second dies by injecting a pressurized fluid between the first and second plates.

4. The method for producing an acoustic treatment panel according to claim 1, wherein the plates are formed by superplastic forming using a die with a grid of grooves.

5. The method for producing an acoustic treatment panel according to claim 1, wherein the plates are assembled by diffusion welding.

6. The method for producing an acoustic treatment panel according to claim 1, further comprising inserting, between the cellular structure and the acoustically resistive structure, a plate with a plurality of furrows so as to delimit, once pressed against the acoustically resistive layer, the plurality of channels configured for channeling hot air for frost treatment.

7. The method for producing an acoustic treatment panel according to claim 1, wherein the first and second deformed plates are assembled at a junction plane that corresponds to the median plane of said cellular structure.

8. An acoustic treatment panel obtained using the method according to claim 1, wherein the panel comprises a cellular structure including the first and second plates, at least one of which is deformed such that said plates are locally separated to form a plurality of cavities between the first and second plates, said cavities being delimited by a plurality of facets and a plurality of partitions produced by at least one of the deformed plates, the facets of one of the first and second plates comprising at least one opening, and an acoustically resistive layer pressed against the surface of the cellular structure with the openings.

9. The acoustic treatment panel according to claim 8, wherein the junction plane of the first and second plates is a median plane.

10. The acoustic treatment panel according to claim 8, further comprising a plurality of channels for channeling hot air for frost treatment.

11. The acoustic treatment panel according to claim 10, wherein at least one groove of the plate that is deformed in contact with the acoustically resistive layer has a flared shape to delimit the channels with said acoustically resistive layer.

12. The acoustic treatment panel according claim 8, further comprising, inserted between the cellular structure and the acoustically resistive structure, a plate with a plurality of furrows so as to delimit, once pressed against the acoustically resistive plate, the plurality of channels.

* * * * *